United States Patent [19]

Hurley et al.

[11] Patent Number: 5,585,452
[45] Date of Patent: Dec. 17, 1996

[54] POLYISOCYANATE BASED UPON 4,4'-AND 2,4'-DIPHENYL-METHANE DLLSOCYANATES AND USE THEREOF IN A RIM PROCESS

[75] Inventors: Michael F. Hurley, Oakdale; Robert G. Eiben, Bridgeville, both of Pa.

[73] Assignee: Bayer Corporation, Pittsburgh, Pa.

[21] Appl. No.: 469,963

[22] Filed: Jun. 6, 1995

Related U.S. Application Data

[63] Continuation of Ser. No. 144,458, Oct. 28, 1993, abandoned.

[51] Int. Cl.$^6$ .................................................. C08G 18/70
[52] U.S. Cl. ........................ 528/67; 528/76; 528/77; 528/85; 521/159; 264/51; 264/328.1; 264/328.6; 264/328.8; 252/182.2; 252/182.21; 252/182.22
[58] Field of Search ........................ 521/159; 528/67, 528/85, 76, 77; 264/51, 328.1, 328.6, 328.8; 252/182.2, 182.21, 182.22

[56] References Cited

U.S. PATENT DOCUMENTS

| | | | |
|---|---|---|---|
| 3,152,162 | 10/1964 | Fischer et al. | 260/453 |
| 3,384,653 | 5/1968 | Ermer et al. | 260/453 |
| 3,394,165 | 7/1968 | McClellan et al. | 260/453 |
| 3,449,256 | 6/1969 | Farrissey, Jr. et al. | 252/182 |
| 3,640,966 | 2/1972 | Hennig et al. | 260/77.5 R |
| 3,641,093 | 2/1972 | Brooks et al. | 260/453 AR |
| 3,644,457 | 2/1972 | König et al. | 260/453 SP |
| 3,674,828 | 7/1972 | Brooks et al. | 260/453 P |
| 3,701,796 | 10/1972 | Saaty et al. | 260/453 SP |
| 3,883,571 | 5/1975 | Allport et al. | 260/453 AM |
| 4,014,935 | 3/1977 | Ibbotson | 260/566 R |
| 4,031,026 | 6/1977 | Ibbotson | 252/182 |
| 4,055,548 | 10/1977 | Carleton et al. | 260/77.5 AT |
| 4,088,665 | 5/1978 | Findeisen et al. | 260/453 AM |
| 4,102,833 | 7/1978 | Salisbury | 521/159 |
| 4,115,429 | 9/1978 | Reiff et al. | 260/453 SP |
| 4,118,411 | 10/1978 | Reiff et al. | 260/453 SP |
| 4,154,752 | 5/1979 | Sundermann et al. | 260/453 SP |
| 4,177,205 | 12/1979 | Schaaf et al. | 260/435 AM |
| 4,218,543 | 8/1980 | Weber et al. | 521/51 |
| 4,229,347 | 10/1980 | Holt et al. | 260/239 A |
| 4,261,852 | 4/1981 | Carroll et al. | 528/59 |
| 4,321,333 | 3/1982 | Alberino et al. | 521/159 |
| 4,332,742 | 6/1982 | Allen | 260/453 SP |
| 4,374,210 | 2/1983 | Ewen et al. | 521/159 |
| 4,433,067 | 2/1984 | Rice et al. | 521/51 |
| 4,442,235 | 4/1984 | Taylor et al. | 521/122 |
| 4,444,910 | 4/1984 | Rice et al. | 521/51 |
| 4,448,904 | 5/1984 | Dominguez | 521/160 |
| 4,478,960 | 10/1984 | Buethe et al. | 521/160 |
| 4,490,300 | 12/1984 | Allen et al. | 260/453 SP |
| 4,490,301 | 12/1984 | Pantone et al. | 260/453 SP |
| 4,490,302 | 12/1984 | Ma et al. | 260/453 AM |
| 4,530,941 | 7/1985 | Turner et al. | 521/176 |
| 4,539,156 | 9/1985 | Dewhurst et al. | 260/453 SP |
| 4,539,157 | 9/1985 | Dewhurst et al. | 260/453 SP |
| 4,539,158 | 9/1985 | Dewhurst et al. | 260/453 SP |
| 4,546,114 | 10/1985 | Alberino et al. | 521/51 |
| 4,585,850 | 4/1986 | Dominguez | 528/122 |
| 4,774,263 | 9/1988 | Weber et al. | 521/51 |
| 4,774,264 | 9/1988 | Weber et al. | 521/51 |
| 4,883,909 | 11/1989 | Slack | 560/351 |
| 4,906,720 | 3/1990 | Parfondry | 528/28 |
| 4,910,333 | 3/1990 | Slack | 560/351 |
| 4,945,117 | 7/1990 | Gansen et al. | 521/99 |
| 5,070,114 | 12/1991 | Watts et al. | 521/159 |
| 5,124,370 | 6/1992 | Scholl et al. | 521/161 |
| 5,238,973 | 8/1993 | Mayer et al. | 521/159 |
| 5,240,635 | 8/1993 | DeGenova et al. | 252/182.21 |
| 5,246,977 | 9/1993 | Mussini | 521/159 |

*Primary Examiner*—James J. Seidleck
*Assistant Examiner*—Duc Truong
*Attorney, Agent, or Firm*—Joseph C. Gil; N. Denise Brown

[57] ABSTRACT

A novel polyisocyanate which is liquid and room temperature stable and has an isocyanate group content of from 10 to 30% by weight is prepared by reacting:

a) an isocyanate mixture of 4,4'-diphenylmethane diisocyanate, 2,4'-diphenylmethane diisocyanate, and an amount of an isocyanate based upon diphenylmethane diisocyanate having an isocyanate functionality of more than 2, such that the total isocyanate mixture a) has an average isocyanate functionality of from 2.02 to 2.50, and b) one or more polyols selected from the group consisting of
   1) diols having molecular weights of from 1000 to 5000,
   2) triols having molecular weights of from 1000 to 6000, and
   3) mixtures thereof.

When used in a RIM process, parts are produced which have excellent low temperature impact properties.

10 Claims, No Drawings

POLYISOCYANATE BASED UPON 4,4'-AND 2,4'-DIPHENYL-METHANE DIISOCYANATES AND USE THEREOF IN A RIM PROCESS

This application is a continuation of application Ser. No. 08/144,458 filed Oct. 28, 1993, now abandoned.

BACKGROUND OF THE INVENTION

Diisocyanates which are liquid at room temperature have numerous advantages over solid diisocyanates. The most commercially important diisocyanates which are solid at room temperature are 4,4'-diphenyl-methane diisocyanate and 2,4'-diphenylmethane diisocyanate. Numerous patents have issued relating to the liquification of diphenyl-methane diisocyanates ("MDI").

One common route to liquification of MDI is through carbodi-imidization. Typical of this process are the processes described in U.S. Pat. Nos. 3,152,162, 3,384,643, 3,449,256, 3,640,966, 3,641,093, 3,701,796, 4,014,935, 4,088,665, 4,154,752, and 4,177,205.

Other less common techniques include reaction with N,N-di(2-hydroxypropyl)aniline (U.S. Pat. No. 3,394,165) and heating with N,N'-disubstituted thioureas (U.S. Pat. No. 3,674,828).

The most common technique used to liquify MDI is through reaction with various hydroxyl functional materials. Thus, the prior art has described several types of liquid isocyanates:

1) reaction products of MDI with poly-1,2-propylene ether glycols having molecular weights of from 134 to 700 (U.S. Pat. No. 3,644.457);

2) reaction products of MDI with a mixture of alkylene glycols containing at least three carbon atoms (U.S. Pat. Nos. 3,883,571 and 4,229,347);

3) mixtures of i) 30 to 80% by weight MDI, ii) 5 to 25% by weight MDI uretonimine-containing derivatives, iii) 20 to 50% by weight reaction products of MDI with diols or mixtures of diols having molecular weights of less than 175, and iv) 0 to 10% by weight polymethlyene poly(phenyl isocyanates) (U.S. Pat. No. 4,031,026);

4) reaction products of polyoxyethylene glycols of molecular weight of from 200 to 600 and polymethylene poly(phenyl isocyanates) containing from 65 to 85% by weight of MDI, with the balance being higher homologues (U.S. Pat. No. 4,055,548);

5) reaction products of MDI with polyols having molecular weights of from 240 to 1500 and functionalities of from 2.7 to 3.3 (U.S. Pat. No. 4,102,833);

6) reaction products of MDI (of various 2,4'-isomer contents) with propylene glycol or poly-1,2-propylene ether glycols (U.S. Pat. No. 4,118,411) or with polyoxyethylene glycols (U.S. Pat. No. 4,115,429);

7) mixtures of i) 50 to 90% by weight reaction products of MDI and blends of 50 to 100% by weight of polyoxypropylene diols or triols having equivalent weights of from 750 to 3000 and 0 to 50% by weight polyoxyethylene diols or triols having equivalent weights of from 750 to 3000, and ii) 10 to 50% by weight of polymethylene poly(phenyl isocyanate) containing 30 to 65% of diphenylmethane diisocyanate (U.S. Pat. No. 4,261,8520;

8) mixtures of i) reaction products of MDI and a polyol blend of a polyol having a molecular weight of at least 1000 and a polyol having a molecular weight of from 115 to 300 and ii) liquified MDI (U.S. Pat. No. 4,321,333);

9) reaction products of MDI and an N-substituted ethanolamine (U.S. Pat. No. 4,332,742);

10) reaction products of MDI containing from 10 to 20% by weight of the 2,4-isomer and a 5500 molecular weight polyether triol (U.S. Pat. No. 4,448,904);

11) reaction products of MDI with a phenyl-substituted alkane diol (U.S. Pat. No. 4,490,300) or with a monoallyl ether of trimethylolpropane (U.S. Pat. No. 4,490,301);

12) reaction products of MDI with mixtures of monoalcohols, poly-1,2-propylene ether glycols and low molecular weight triols (U.S. Pat. No. 4,490,302);

13) reaction products of MDI of various isomer contents with 1,3-butane diol and propylene glycol (U.S. Pat. No. 4,539,156), with neopentyl glycol and propylene glycol (U.S. Pat. No. 4,539,157) and 1,3-butane diol and neopentyl glycol (U.S. Pat. No. 4,539,158);

14) reaction products of MDI with amines and tripropylene glycol (U.S. Pat. No. 4,883,909);

15) reaction products of MDI high molecular weight polyols and tripropylene glycol (U.S. Pat. Nos. 4,442,235 and 4,910,333);

16) mixtures of i) reaction products of MDI and a polyol of equivalent weight of from 30 to 600 and ii) polymethylene poly(phenyl isocyanate) (U.S. Pat. No. 5,240,635); and 17) mixtures of i) reaction products of MDI and polyoxytetra-methylene glycols of equivalent weight of from 250 to 1500, and ii) up to 30% by weight of a second isocyanate which can be the 2,4'-isomer or a polymethylene poly(phenyl isocyanate) (U.S. Pat. No. 5,246,977).

A variety of different molded polyurethane parts can be produced by the reaction injection molding ("RIM") process. This process involves filling a closed mold with highly reactive liquid starting components within a very short time, generally by using high output, high pressure dosing apparatus after the components have been mixed. The RIM process has become an important process for the production of external automotive body parts and other types of molded products. The RIM process involves the intimate mixing of a polyisocyanate component and an isocyanate-reactive component, followed by the injection of this mixture into a mold for subsequent rapid curing. The polyisocyanate component is typically based on a liquid polyisocyanate. The isocyanate-reactive component contains a high molecular weight isocyanate-reactive component, typically a polyol and/or an amine polyether, and usually contains a chain extender containing amino and/or hydroxyl groups. U.S. Pat. No. 4,218,543 describes a RIM process currently being commercially used on a large scale. U.S. Pat. Nos. 4,433,067, 4,444,910, 4,530,941, 4,774,263, and 4,774,264 describe reaction injection molding processes for the production of polyurethane(urea) elastomers. As used herein, the term "polyurethanes" includes polyurethanes, polyureas, and polyurethane polyureas.

Although the process described in the '543 patent has met with commercial success, the industry has searched for ways to reduce the density of the molded parts while at the same time maintaining the overall excellent physical properties of the parts.

DESCRIPTION OF THE INVENTION

The present invention is directed to novel isocyanates and the use thereof in a RIM process. More particularly, the invention is directed to a liquid, room temperature stable, polyisocyanate having an isocyanate group content of from 10 to 30% by weight and being prepared by reacting:
a) an isocyanate mixture comprising:
1) from 45 to 96% by weight of 4,4'-diphenylmethane diisocyanate.
2) from 1 to 10% by weight of 2.4'-diphenylmethane diisocyanate, and
3) an amount of an isocyanate based upon diphenylmethane diisocyanate having an isocyanate functionality of more than 2, such that the total isocyanate mixture a) has an average isocyanate functionality of from 2.02 to 2.50, and
b) one or more polyols selected from the group consisting of
1) diols having molecular weights of from 1000 to 5000,
2) triols having molecular weights of from 1000 to 6000, and
3) mixtures thereof.

The invention is also directed to a process for the production of a molding by reacting a reaction mixture comprising: a) a polyisocyanate, b) one or more relatively high molecular weight active hydrogen group containing compounds, and c) one or more relatively low molecular weight chain extenders, said reaction mixture being processed as a one-shot system by the RIM process at an isocyanate index of from about 70 to about 130. The improvement resides is using as the above-identified novel polyisocyanate.

The use of the specific isocyanate allows for the production of molded products having densities which can vary over a wide range and which have excellent physical properties over that wide range. Surprisingly, also, at the low densities (i.e., less than 1.0 g/cc) the molded products have excellent low temperature (i.e., −18° and −30° C.) impact properties. In some cases, improved elongation and improved tear strength were also attained.

The isocyanate used herein has an isocyanate group content of from 10 to 30% by weight, preferably from 15 to 25% by weight, and most preferably from 18 to 23% by weight and is the reaction product of:
a) an isocyanate mixture comprising: 1) from 45 to 96% (preferably from 80 to 95%, and most preferably from 90 to 94%) by weight of 4,4'-diphenyl ethane diisocyanate,
2) from 1 to 10% (preferably from 2 to 7%, and most preferably from 4 to 6%) by weight of 2,4'-diphenylmethane diisocyanate, and
3) an amount of an isocyanate based upon diphenylmethane diisocyanate having an isocyanate functionality of more than 2, such that the total isocyanate mixture a) has an average isocyanate functionality of from 2.02 to 2.50 (preferably from 2.05 to 2.20), and
b) one or more polyols selected from the group consisting of
1) diols having molecular weights of from 1000 to 5000 (preferably from 2000 to 4000),
2) triols having molecular weights of from 1000 to 6000 (preferably from 1500 to 5500), and
3) mixtures thereof.
When mixtures of the polyols are used, they are preferably used in weight ratios of b)1) to b)2) of from 10:1 to 1:10, more preferably from 6:4 to 4:6 and most preferably 1:1.

The individual components of the isocyanate mixture are known in the art. As is known, polymethylene poly(phenyl isocyanates) are prepared by aniline-formaldehyde condensation followed by phosgenation. As is known in the art, the relatively pure diisocyanate isomers are obtained by distilling the resultant polymethylene poly(phenyl isocyanate). Upon distillation, the distillate consists largely of the 4,4'-isomer with a smaller amount of the 2,4'-isomer, and with relatively small or trace amounts of the 2,2'-isomer. By further refining techniques known in the art, it is possible to obtain isomer mixtures having varied ratios of the 4,4'- and 2,4'-isomers. Known processes for preparing such isocyanates are described,e.g., in U.S. Pat. Nos. 2,683,730, 2,950, 263, 3,012,008, 3,344,162 and 3,362,979.

It is critical to the present invention that the isocyanate mixture have an average isocyanate functionality of from 2.02 to 2.50 (and preferably from 2.05 to 2.20 ). This average functionality is attained by adding isocyanates based upon diphenylmethane diisocyanates which have isocyanate functionalities higher than 2. Such higher functional isocyanates are known in the art and include polymethylene poly(phenyl isocyanates) (which are prepared by the phosgenation of aniline-formaldehyde condensation products) and so-called "modified" isocyanates. The modified isocyanates useful herein include carbodiimidized diphenylmethane diisocyanate (see, e.g., U.S. Pat. Nos. 3,152,162, 3,384,653, and 3,449,256, German Offenlegungsschrift 2,537,685); polyisocyanates containing allophanate groups (see, e.g., British Patent 993,890, Belgian Patent 761,626 and published Dutch Application 7,102,524); polyisocyanates containing isocyanurate groups (see, e.g., U.S. Pat. No. 3,001,973, German Patents 1,022,789, 1,222,067, and 1,027, 294 and German Offenlegungschriften 1,929,034 and 2,004, 408); and polyisocyanates containing biuret groups (see, e.g., U.S. Pat. Nos. 3,124,605 and 3,201,372 and British patent 889,050). Thus, in the preferred embodiment, the higher functional isocyanates are selected from the group consisting of polymethylene poly(phenyl isocyanates), carbodiimide group-containing polyisocyanates, allophanate group-containing polyisocyanates, isocyanurate group-containing poly-isocyanates. biuret group-containing polyisocyanates, and mixtures thereof. Presently the most preferred higher functional isocyanates are polymethylene poly(phenyl isocyanates).

The diols and triols used to produce the isocyanate products of the present invention are known in the polyurethane art. They include polyesters, polyethers, polythioethers, polyacetals, and polycarbonates. Polyethers are presently preferred. The polyethers diols and triols may be obtained, for example, by polymerizing epoxides such as ethylene oxide, propylene oxide, butylene oxide, tetrahydrofuran, styrene oxide, or epichlorohydrin in the presence of $BF_3$ or by chemically adding these epoxides, preferably ethylene oxide and propylene oxide, in admixture or successively to components containing reactive hydrogen atoms such as water or alcohols, or amines. Examples of suitable alcohols include ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, and trimethylolpropane. The presently preferred polyether diol is based upon propylene glycol and propylene oxide. The presently preferred polyether triol is based upon glycerol, propylene oxide and ethylene oxide. While either the diol or triol can be used alone, it is generally preferred to use a mixture of the diol and triol since it has been found that such blends give the optimum balance of processing ease and product performance. The diol allows good flow in the mold and contributes towards good impact properties, while the triol improves demold characteristics and properties such as flex modulus, tear strength, and tensile strength.

Suitable reactants for use in the RIM process of the present invention include relatively high molecular weight compounds containing at least two isocyanate-reactive groups. These compounds generally have molecular weights of from 400 to about 10,000. The relatively low molecular weight chain extenders have molecular weights of from 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide, or epichlorohydrin in the presence of BF3 or by chemically adding these epoxides, preferably ethylene oxide and propylene oxide, in admixture or successively to components containing reactive hydrogen atoms such as water, alcohols, or amines. Examples of alcohols and amines include the low molecular weight chain extenders set forth hereinafter, 4,4'-dihydroxy-diphenylpropane, sucrose, aniline, ammonia, ethanolamine, and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351, 3,304,273, 3,523,093, and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent (preferably divalent) carboxylic acids. Instead of using the free carboxylic acids, it is also possible to use corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted (for example, by halogen atoms). The polycarboxylic acids and polyols used to prepare the polyesters are known and described, for example, in U.S. Pat. Nos. 4,098,731 and 3,726,952, herein incorporated by reference in their entirety. Suitable polythioethers, polyacetals, polycarbonates, and other polyhydroxyl compounds are also disclosed in the above-identified U.S. Patents. Finally, representatives of the many and varied compounds which may be used in accordance with the invention may be found for example in High Polymers, Volume XVI, "Polyurethanes, Chemistry and Technology," by Saunders and Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Höchtlen, Carl Hanser Verlag, Munich, 1966, pages 45–71.

Suitable aminopolyethers which may be used in accordance with the present invention as high molecular weight compounds (the molecular weight always being the average molecular weight which may be calculated from the functionality and the content of isocyanate-reactive groups) are those wherein at least about 30 and preferably about 60 to 100 equivalent percent of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by known methods. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, or chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and in French Patent 1,551,605. The production of polyethers containing terminal secondary amino groups is described, for example, in French Patent 1,466,708.

Polyhydroxypolyethers of relatively high molecular weight may be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428, and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of NCO prepolymers based on polyhydroxypolyethers with enamines, aldimines, or ketimines containing hydroxyl groups and subsequent hydrolysis.

It is preferred to use amino polyethers obtained by hydrolysis of compounds containing terminal isocyanate groups, for example, in accordance with German Offenlegungsschrift 2,948,419 or U.S. Pat. No. 4,515,923, herein incorporated by reference in its entirety. In this process, polyethers most preferably containing 2 to 4 hydroxyl groups are allowed to react with polyisocyanates to form NCO prepolymers and, in a second step, the isocyanate groups are converted by hydrolysis into amino groups.

The aminopolyethers used in accordance with the invention are often mixtures of the compounds mentioned by way of example and (on a statistical average) most preferably contain 2 to 4 terminal isocyanate-reactive groups. In the process according to the invention, the aminopolyethers may be used in admixture with polyhydroxypolyethers free from amino groups.

In accordance with the present invention, the high molecular weight compounds are used in admixture with up to about 95% by weight (preferably up to about 50% by weight, more preferably about 8 to 30% by weight, and most preferably about 12 to 26% by weight), based on the total quantity of the high molecular weight compounds, of the low molecular weight chain extenders. Examples of suitable hydroxyl group-containing chain extenders include ethylene glycol, 1,2- and 1,3-propane-diol 1,3- and 1,4- and 2,3-butanediol, 1,6-hexanediol, 1,10- decanediol, diethylene glycol, triethylene glycol, tetraethylene glycol, dipropylene glycol, tripropylene glycol, glycerol, and trimethylolpropane.

Other suitable chain extenders include aromatic polyamines (preferably diamines) having molecular weights of less than 400, especially the sterically hindered aromatic polyamines (preferably diamines) having molecular weights of less than 400, especially the sterically hindered aromatic diamines which contain at least one linear or branched alkyl substituent in the ortho-position to the first amino group and at least one (preferably two) linear or branched alkyl substituents containing from 1 to 4 (preferably 1 to 3) carbon atoms in the ortho-position to a second amino group. These aromatic diamines include 1-methyl-3,5-diethyl-2,4-diaminobenzene, 1-methyl-3,5-diethyl-2,6-diamino-benzene, 1,3,5-trimethyl-2,4-diaminobenzene, 1,3,5-triethyl-2,4-diamino-benzene, 3,5,3',5'-tetraethyl-4,4'-diaminodiphenylmethane, 3,5,3',5'-tetraisopropyl-4,4'-diaminodiphenylmethane, 3,5-diethyl-3',5'- diisopropyl-4,4'-diaminodiphenylmethane, 3,3'-diethyl-5,5'- diisopropyl-4,4'-diaminodiphenylmethane, 1-methyl-2,6-diamino-3-isopropylbenzene, and mixtures of the above diamines. Most preferred are mixtures of 1-methyl-3,5-diethyl-2,4-diaminobenzene and 1-methyl-3,5-diethyl-2,6-diaminobenzene in a weight ratio between about 50:50 to 85:15 (preferably about 65:35 to 80:20).

In addition, aromatic polyamines may be used in admixture with the sterically hindered chain extenders and include, for example, 2,4- and 2,6-diaminotoluene, 2,4'- and/or 4,4'-diaminodiphenylmethane, 1,2- and 1,4-phenylenediamine, naphthalene- 1,5-diamine and triphenylmethane4,4',4"-triamine. The difunctional and polyfunctional aromatic amine compounds may also exclusively or partly contain secondary amino groups such as 4,4'-di(methylamino)diphenylmethane or 1-methyl-2-methylamino-4-aminobenzene. Liquid mixtures of polyphenyl poly-methylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

Other materials which can be included in the reaction mixture included any of the materials generally used in the RIM art. For example, rigid microspheres, which can be hollow microspheres (also known as microballoons or microbubbles) or solid microspheres can be included. When preparing low-density materials, for example, hollow spheres are generally preferred. However, regardless of whether the microspheres are hollow or solid, they should be heat resistant and essentially incompressible when subjected to elevated temperatures and pressure during the molding process. In a typical RIM process, compression strengths greater than about 12 MPa (preferably greater than 20 MPa) are generally suitable. With hollow microspheres, wall thickness is, of course, a selection factor.

Suitably rigid microspheres may be made of inorganic materials, such as glass, ceramic, and carbon, or rigid organic polymers, such as phenolic resins. Solid microspheres can be prepared by any of several methods known in the art. For example, solid microspheres can be prepared by softening irregularly shaped particles just enough for them to flow into spheres under the influence of surface tension, by quenching a melt in a cooler medium, or by carrying out polymerizations in well-stirred suspensions at elevated temperature.

Hollow inorganic microspheres can be prepared by several known methods. For example, hollow glass spheres can be prepared by grinding and sizing soda-lime glass cullet to form particles that, in combination with blowing agents, are passed through a gas flame (ca. 1000° C.) to soften the glass and generates gases that expand the particles. See U.S. Pat. No. 3,365,315. Hollow glass spheres can also be prepared by spray-drying a sodium borosilicate solution containing a blowing agent to form a particulate material that is passed through a gas flame to form the spheres. See U.S. Pat. No. 2,978,339. Ceramic microspheres can be obtained as both solid and hollow microspheres as a normal aluminosilicate by-product of burning coal. In general, hollow ceramic microspheres are heavier than similarly sized glass microspheres. Although inorganic microspheres can be treated with a silane or titanate coupling agent to enhance adhesion with the matrix urethane polymer, the untreated particles generally exhibit sufficient adhesion to the polymer, making such treatments unnecessary.

Commercially available hollow inorganic microspheres include ceramic Z-Light Spheres and glass Scotchlite K46 Glass Bubbles from 3M Company. See also, J. F. Plummer, "Microspheres" in Encyclopedia of Polymer Science and Technology, Vol. 9 (John Wiley & Sons, Inc., 1987), page 788.

Solid microspheres of organic polymers can be prepared using aqueous dispersions of suitable film-forming thermoset or thermoplastic materials. In the presence of a blowing agent, this method gives hollow microspheres.

It is typical of available rigid microspheres that a given sample contains a range of sizes. Suitable microspheres for the present invention typically have a diameter of between about 1 and about 350 μm (preferably 10 to 210 μm. The specific size range, however, is often dependent on the selection of particular injection equipment and operating parameters (for example, nozzle diameter).

Low density (especially hollow) microspheres are preferred, with those having densities ranging from 0.05 to 2.5 g/cc being particularly preferred.

The rigid microspheres can be added to either the isocyanate component or the isocyanate-reactive component, although addition to isocyanate-reactive component is preferred. When used, the micro-spheres are added in amounts such that the final products have a total microsphere content of from about 0.5 to about 40% (preferably 2 to 10%) by weight. Products having density reductions in the range from 10 to 30% are readily obtained.

Although less preferred, it is also possible to include known compressible expanded microspheres, such as those described in U.S. Pat. Nos. 4,829,094, 4,843,104, 4,902,722 and 4,959,395, but the amount of such microspheres should not exceed 50% by weight of the amount of the rigid microspheres. Commercially available compressible microspheres include Dualite M6017E, Dualite M6001AE, and Dualite M6029AE, all available from Pierce & Stevens Corporation, and Expancel available from Nobel Industries. These commercially available compressible microspheres are expanded, hollow microspheres consisting of a thin shell of a vinylidene chloride, polypropylene, or acrylonitrile copolymer. The interior of the Dualite and Expancel microspheres contains a volatile liquid, such as a low-boiling hydrocarbon (which is pentane for Dualite microspheres and isobutane for Expancel microspheres), which is used to expand the microsphere and remains inside the shell thereafter. An organic or inorganic material that decomposes upon only moderate heating will also serve to expand the microsphere, with the decomposition products remaining in the shell thereafter. Also present on the outside of Dualite microspheres is a rough coating of calcium carbonate dust.

In one preferred embodiment of the invention, which is particularly suitable for preparing low-density products, an inert gas is introduced into one or more of the reactive components (preferably into component (b)) using techniques known in the art. As used herein, the term "inert gas" refers to gaseous materials that are essentially unreactive under the conditions used in the process of the invention. Examples of suitable inert gases include air, nitrogen, argon, carbon dioxide, or mixtures thereof.

When preparing the preferred low density products, the inert gas is introduced in sufficient quantity to give products having densities of from 0.75 g/cc to 1.1 g/cc. The inert gas is preferably introduced using commercial equipment, such as Diffuser Stone-KIMEX mixers and venturi type mixers. The presently preferred device is a Hennecke Aeromat-GU which is described in Hennecke Trade Bulletin #41 and in a 1991 article entitled "Consistent Distribution of Finely Dispersed Gases in Polyol Streams", Proksa et al, Polyurethanes World Congress. Sufficient inert gas is customarily introduced into the system in an amount in excess of the amount necessary to saturate the particular component at a feed tank pressure of from about 0.21 to about 0.35 N/mm$^2$. As is known in the art, material flows from the feed tank through a transfer pump (which increases the pressure of the particular component) through a metering pump to the mixhead. Discharge pressures of the transfer pump are generally in the range of 0.35 to 0.7 N/mm$^2$, while discharge pressures of the metering pump are generally in the range of 14 to 21 N/mm$^2$. The amount of the gas in the system is generally monitored using commercial measuring equipment which responds to changes in specific gravity of the liquid components. One such device is the Dynatrol (manufactured by Automation Products), which permits the effective control of the gas content by monitoring any changes in the specific gravity of the liquid component.

When preparing low density products, factors that are important to achieving high quality low density product include enhanced flow characteristics and reduced nucleation density of the isocyanate-reactive component. Good flow properties are important because relatively smaller quantities of reactive materials are required for low density products. Reduced nucleation density is directly related to an increased amount of inert gas dissolved or dispersed in the isocyanate-reactive component and ultimately to a lower density product. The use of rigid microspheres according to the present invention has been found to be particularly useful in enhancing both the flow characteristics and the nucleation density of the isocyanate-reactive component, as well as reducing the time required to achieve a given nucleation density. As a result, a significant reduction in density for the molded parts is achieved while at the same time improving demold characteristics (such as mold release, green strength, and hot tear strength) without adversely affecting physical properties. In fact, impact resistance is consistently improved. The use of hollow rather than solid microspheres provides an even further reduction in density, while still providing improved physical properties and demold characteristics, and is thus particularly preferred.

Reinforcing fillers, which allow reduced contraction of the molded product upon cooling, as well as adjustment of tensile modulus and flex modulus, can also be used and are well known in the art. Suitable inorganic fillers include glass in the form of fibers or flakes, mica, wollastonite, carbon black, talc, calcium carbonate, and carbon fibers. Organic fillers, although less preferred, are also suitable.

Other additives which may be used in the present invention include catalysts, especially tin(11) salts of carboxylic adds, diaikyltin salts of carboxylic acids, dialkyltin mercaptides, dialkyltin dithioesters, and tertiary amines. Preferred among these catalysts are dibutyltin dilaurate and 1,4-diazabicyclo[2,2,21] octane (triethylene diamine), especially mixtures of these catalysts. The catalysts are generally used in amounts of about 0.01 to 10% (preferably about 0.05 to 2%), based on the weight of the high molecular weight component.

It is also possible to use surface-active additives such as emulsifiers and foam stabilizers. Examples include siloxanes, N-stearyl-N', N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxyethyl imidazole derivative of oleic acid, N-stearyl propylene diamine, and the sodium salts of castor oil sulfonates or of fatty adds. Alkali metal or ammonium salts of sulfonic add, such as dodecylbenzenesulfonic add or dinaphthylmethanesulfonic add, and fatty adds may also be used as surface-active additives. Particularly suitable surface-active compounds include polyether siloxanes of the type generally known for use in the polyurethane art, such as water-soluble polyether siloxanes. The structure of these siloxanes is generally such that a copolymer of ethylene oxide and propylene oxide is attached to a polydimethylsiloxane functionality. Methods of manufacturing preferred siloxanes are described in U.S. Pat. No. 4,906,721, the disclosure of which is herein incorporated by reference.

It is also possible to use mold release agents, which are compounds that are added to the reactive components of the isocyanate addition reaction, usually the isocyanate-reactive component, to assist in the removal of a polyurethane product from a mold. Suitable mold release agents for the present invention include those based at least in part on fatty add esters (e.g., U.S. Pat. Nos. 3,726,952, 3,925,527, 4,058, 492, 4,098,731, 4,201,847, 4,254,228, 4,868,224, and 4,954, 537 and British Patent 1,365,215); metal and/or amine salts of carboxylic acids, amido carboxylic acids, phosphorus-containing adds, or boron-containing acids (e.g., U.S. Pat. Nos. 4,519,965, 4,581,386, 4,585,803, 4,876,019, 4,895, 879, and 5,135,962); polysiloxanes (e.g., U.S. Pat. No. 4,504,313); amidines (e.g., U.S. Pat. Nos. 4,764,540, 4,789, 688, and 4,847,307); resins prepared by the reaction of isocyanate prepolymers and a polyamine-polyimine component (e.g., U.S. Pat. No. 5,198,508); neutralized esters prepared from certain amine-started tetrahydroxy compounds described in U.S. Pat. No. 5,208,268; and aliphatic polyalkylene and polyalkadienes. Preferred mold release agents contain zinc stearate.

In addition to the reinforcement fillers, catalysts, surface-active agents, and mold release agents mentioned above, other additives which may be used in the molding compositions of the present invention include known fillers of other types, blowing agents, cell regulators, flame retarding agents, plasticizers, and dyes of the types generally known in the art.

The compositions according to the present invention are especially suited for processing by the RIM process. In general, two separate streams are intimately mixed and subsequently injected into a suitable mold, although it is possible to use more than two streams. The first stream contains the polyisocyanate component, whereas the second stream contains the isocyanate-reactive component, chain extender, any internal mold release agent, and any other additives which are to be included.

The quantity of polyisocyanate used in the process according to the present invention is preferably calculated so that the reaction mixture has an isocyanate index of from 70 to 130 (preferably from 90 to 110). By "isocyanate index" is meant the quotient of the number of isocyanate groups and number of groups which are reactive with isocyanates, multiplied by 100.

The known RIM process is used for carrying out the process according to the present invention. In general, the components may be mixed simultaneously, or the non-reactive components may be pre-mixed and then mixed with the reactive components. A starting temperature of from 10° to 70° C. (preferably from 30° to 50° C.) is generally chosen for the mixture introduced into the mold. The temperature of the mold itself is generally from 40° to 100° C. (preferably from 50° to 70° C.). After completion of the reaction and molding process, the resultant product is removed from the mold.

The process of the invention is characterized by improved mold release, which permits less frequent use of mold release agents (particularly external mold release agents) and less frequent cleaning of product residues and/or fragments from the molds or aftermixers.

The moldings obtainable by the process according to the present invention are particularly suitable for the manufacture of a variety of polyurethane products. For example, in a preferred embodiment of the invention, low density products such as flexible car bumpers and car body elements can be produced. With suitable variation of the starting components, particularly by using a relatively low proportion of the active diamine, it is also possible to produce materials which have good abrasion resistance and high mechanical strength, such as flexible polyurethane shoe soles.

The following examples further illustrate details for the process of this invention. Unless otherwise noted, all temperatures are degrees Celsius and all parts and percentages are parts by weight and percentages by weight, respectively.

EXAMPLES

The examples describe the formulations and molding procedures for the data supplied in Tables 1, 2, 3 and 4. Tables 1, 2, 3 and 4 set forth the physical properties of the parts molded in each example. The following ASTM tests were used:

Density—ASTM D-1622

Tear, die C—ASTM D-624

Tensile Strength—ASTM D-412

Elongation at break—ASTM D-412

Flexural Modulus—ASTM D-790

5 mph Dad Impact—ASTM D-3763-86

Examples 1, 3, and 5 are controls for comparison of the higher 2,4'-MDI materials and used an isocyanate prepared by reading a mixture of about 98% by weight of 4,4'-MDI and 2% by weight of 2,4'-MDI with tripropylene glycol, with the final reaction product having an isocyanate group content of about 22.5% by weight. Examples 2, 4, 6, 7 and 8 employ the novel isocyanate of the present invention. The new isocyanate of Examples 2, 4, 6, 7 and 8 was produced from the following:

12 parts by weight of a diphenylmethane diisocyanate-based polyisocyanate consisting of 16% by weight 2,4'-MDI, 56% by weight 4,4'-MDI, and 28% by weight higher oligomers of MDI, having an isocyanate group content of 32.6 and an average isocyanate functionality of 2.29;

52 parts by weight of a mixture of about 98% 4,4'-MDI and 2% 2,4'-MDI;

18 parts by weight of a glycerin initiated polyol of 4800 molecular weight and a PO/EO weight ratio of about 5:1); and 18 parts by weight of a propylene glycol started polyether polyol of molecular weight 2000.

To produce the isocyanate, a reaction vessel was first heated to about 50° C. The diphenylmethane diisocyanate-based polyisocyanate (12 parts) and the MDI mixture (52 parts) were then added to the reacion vessel. The two polyols were then added and the mixture was heated with agitation. The reaction mixture was held at 65 to 70° C. until the reaction was complete (about two hours). The completion of the reaction was determined by measurement of the %NCO of the reaction product. The reaction was considered complete once the %NCO equalled the theoretical %NCO based upon the amounts of reactants.

Example 1

A polyol blend was prepared from 74.2 parts of a 6000 molecular weight trifunctional polyether polyol (glycerin starter, with a PO/EO weight ratio of about 5:1), 17 parts of diethyltoluene diamine ("DETDA"), 8 parts of a zinc stearate concentrate (consisting of 4 parts of 400 molecular weight diamine (Jeffamine D-400, available from Texaco), 2 parts of zinc stearate, and 2 parts of a 356 molecular weight tetrafunctional polyol (prepared from ethylene diamine and propylene oxide)), 0.1 part of Dabco 33-LV (a triethylene diamine commercially available from Air Products), and 0.1 part of Witco UL-28 (a dimethyl tin dilaurate commercially available from Witco).

The polyol blend was charged to the polyol run tank of an HK-500 RRIM machine. The blend was nucleated via a sparger tube nucleator with nitrogen. A density level of 0.72 g/cc was attained.

This polyol blend was reacted with the isocyanate at a weight ratio of 47 parts of isocyanate to 100 parts of the blend. Urethane parts were molded on a HK-500 RRIM machine. The mold was a steel mold (P-20 steel) having the dimensions of 3.0 mm×61.0 mm×91.4 mm. The chemical temperatures were maintained at 43° to 46° C. for the isocyanate and 52° to 57° C. for the polyol blend. The mixing pressures were 10 N/mm$^2$ for each component.

Example 2

Example 1 was repeated using another chemical formulation. A polyol blend was prepared from 70.2 parts of a 6000 molecular weight trifunctional polyether polyol (glycerin starter, with a PO/EO weight ratio of about 5:1), 21 parts of diethyltoluene diamine ("DETDA"), 8 parts of a zinc stearate concentrate (consisting of 4 parts of 400 molecular weight diamine (Jeffamine D-400, available from Texaco), 2 parts of zinc stearate, and 2 parts of a 356 molecular weight tetrafunctional polyol (prepared from ethylene diamine and propylene oxide)), 0.1 part of Dabco 33-LV (a triethylene diamine commercially available from Air Products), and 0.1 part of Witco UL-28 ( a dimethyl tin dilaurate, commercially available from Witco). The polyol blend was charged to the polyol run tank of a HK-500 RRIM machine. The polyol was nucleated via a sparger tube nucleator with nitrogen. A density level of 0.75 g/cc was attained.

This blend was reacted with the isocyanate at a weight ratio of 69 parts of isocyanate to 100 parts of polyol blend. Urethane parts were molded on a HK-500 RRIM machine. The mold was a steel mold (P-20 steel) having the dimensions of 3.0 mm×61.0 mm×91.4 min. The chemical temperatures were maintained at 43° to 46° C. for the isocyanate and 52° to 57° C. for the polyol blend. The mixing pressures were 11 N/mm$^2$ for each component.

Example 3

Example 1 was repeated using another polyol blend and a reinforcing filler package. A polyol blend was prepared from 74.3 parts of a 6000 molecular weight trifunctional polyether polyol (glycerin starter, with a PO/EO weight ratio of about 5:1 ), 17 parts of diethyltoluene diamine ("DETDA"), 8 parts of a zinc stearate concentrate (consisting of 4 parts of 400 molecular weight diamine (Jeffamine D-400, available from Texaco), 2 parts of zinc stearate, and 2 parts of a 356 molecular weight tetrafunctional polyol (prepared from ethylene diamine and propylene oxide)), 0.1 part of Dabco 33-LV (a triethylene diamine commercially available from Air Products), 0.05 parts of Dabco T-12 (a dibutyl tin dilaurate commercially available from Air Products), and 0.1 part of Witco UL-28 ( a dimethyl tin dilaurate, commercially available from Witco). A polyol slurry was prepared from the polyol blend and Nyad G Wollastokup (available from Nyco). The weight ratio of polyol blend to Wollastokup filler was 100 to 34.

The polyol slurry was charged to the polyol run tank of a Cincinnati Milacron CM-90 RRIM machine. The slurry was nucleated via a hollow shaft high rpm nucleator based on the use of cavitation to introduce nitrogen. A density level of 0.68 g/cc was attained.

This slurry was reacted with the isocyanate at a weight ratio of 40 parts of isocyanate to 100 parts of the slurry. Urethane parts were molded on a Cincinnati Milacron CM-90 RRIM machine. The mold was a steel mold (P-20 steel) having the dimensions of 4.5 mm×64 cm×92 cm. The chemical temperatures were maintained at 43° to 46° C. for the isocyanate and 52° to 57° C. for the polyol slurry. The mixing pressures were 11.2 N/mm$^2$ for each component.

Example 4

Example 3 was repeated using the isocyanate of the present invention. A polyol blend was prepared as in example 2. A polyol slurry was prepared from the polyol blend and Nyad G Wollastokup (available from Nyco). The weight ratio of polyol blend to Wollastokup filler was 100 to 38, respectively.

The polyol slurry was charged to the polyol run tank of a Cincinnati Milacron CM-90 RRIM machine. The slurry was nucleated via a hollow shaft high rpm nucleator based on the use of cavitation to introduce nitrogen. A density level of 0.68 g/cc was attained.

The above polyol slurry was reacted with the isocyanate at a weight ratio of 52 parts of isocyanate to 100 parts of the slurry. Urethane parts were molded on a Cincinnati Milacron CM-90 machine. The mold was a steel mold (P-20 steel) having the dimensions of 4.5 mm×64 cm ×92 cm. The chemical temperatures were maintained at 43° to 46° C. for the isocyanate and 52° to 57°C. for the polyol slurry. The mixing pressures were about 11.2 N/mm$^2$ for each component.

Example 5

Example 3 was repeated using another reinforcing filler package. A polyol blend was prepared as in Example 3. A polyol slurry was then prepared from the polyol blend, Nyad G Wollastokup (available from Nyco) and Dualite M-6017-AE (commercially available from Pierce & Stevens). The weight ratio of polyol slurry to Wollastokup filler to Dualite filler was 100:34:1.9.

The polyol slurry was charged to the polyol run tank of a Cincinnati Milacron CM-90 RRIM machine. The slurry was nucleated via a hollow shaft high rpm nucleator based on the use of cavitation to introduce nitrogen. A density level of 0.64 g/cc was attained.

This slurry was reacted with the isocyanate at a weight ratio of 39 parts of isocyanate to 100 parts of the slurry. Urethane parts were molded on a Cincinnati Milacron CM-90 machine. The mold was a steel mold (P-20 steel) having the dimensions of 4.5 mm×64 cm×92 cm. The chemical temperatures were maintained at 43° to 46° C. for the isocyanate and 52° to 57° C. for the polyol slurry. The mixing pressures were about 11.2 N/mm$^2$ for each component.

Example 6

Example 4 was repeated using another filler package. A polyol blend was prepared using as in Example 4. A polyol slurry was prepared from the polyol blend, Nyad G Wollastokup (available from Nyco) and Dualite M-6017-AE (commercially available from Pierce & Stevens). The weight ratio of polyol blend to Wollastokup filler to Dualite filler was 100:38:2.1.

The above polyol slurry was reacted with the isocyanate at a weight ratio of 51 parts of isocyanate to 100 parts of the slurry. Urethane parts were molded on a Cincinnati Milacron CM-90 machine. The mold was a steel mold (P-20 steel) having the dimensions of 4,5 mm×64 cm×92 cm. The chemical temperatures were maintained at 43° to 46° C. for the isocyanate and 52° to 57° C. for the polyol slurry. The mixing pressures were about 11.2 N/mm$^2$ for each component. Example 7

A polyol blend was prepared from 69.25 parts of a 6000 molecular weight trifunctional polyether polyol (glycerin starter, with a PO/EO weight ratio of about 5:1), 22 parts of diethyltoluene diamine ("DETDA"), 8 parts of a zinc stearate concentrate (consisting of 4 parts of 400 molecular weight diamine (Jeffamine D-400, available from Texaco), 2 parts of zinc stearate, and 2 parts of a 358 molecular weight tetrafunctional polyol (prepared from ethylene diamine and propylene oxide)), 0.1 part of Dabco 33-LV (a triethylene diamine commercially available from Air Products), and 0.1 part of Witco UL-28 (a dimethyl tin dilaurate, commercially available from Witco). A polyol slurry was prepared from the polyol blend, Nyad G Wollastokup (available from Nyco) and Z-Light W-1000 (commercially available from 3M). The weight ratio of polyol blend to Wollastokup filler to Z-Light was 100:16:8.6.

This polyol slurry was charged to the polyol run tank of a Cincinnati Milacron CM-90 RRIM machine. The slurry was nucleated via a hollow shaft high rpm nucleator based on the use of cavitation to introduce nitrogen. A density level of 0.53 g/cc was attained.

The above polyol slurry was reacted with the isocyanate at a weight ratio of 52 parts of isocyanate to 100 parts of the slurry. Urethane parts were molded on a Cincinnati Milacron CM-90 machine. The mold was a steel mold (P-20 steel) having the dimensions of 4.5 mm×64 cm×92 cm. The chemical temperatures were maintained at 43° to 46° C. for the isocyanate and 52° to 57° C. for the polyol slurry. The mixing pressures were about 11.2 N/mm² for each component. Example 8

Example 7 was repeated using another filler package. A polyol blend was prepared using the identical materials as used in Example 7.

A polyol slurry was prepared from the polyol blend, Nyad G Wollastokup (available from Nyco) and Z-Light W-1000 (commercially available from 3M). The weight ratio of polyol blend to Wollastokup filler to Z-Light filler was 100:16.3:14.2.

This polyol slurry was charged to the polyol run tank of a Cincinnati Milacron CM-90 RRIM machine. The slurry was nucleated via a hollow shaft high rpm nucleator based on the use of cavitation to introduce nitrogen. A density level of 0.53 g/cc was attained.

The polyol slurry was reacted with the isocyanate at a weight ratio of 51 parts of isocyanate to 100 parts of the slurry. Urethane parts were molded on a Cincinnati Milacron CM-90 machine. The mold was a steel mold (P-20 steel) having the dimensions of 4.5 mm×64 cm×92 cm. The chemical temperatures were maintained at 43° to 46° C. for the isocyanate and 52° to 57° C. for the polyol slurry. The mixing pressures were about 11.2 N/mm² for each component.

TABLE 1

|  | Example 1 | Example 2 |
| --- | --- | --- |
| Density (g/cc) | 1.00 | 1.01 |
| Tear (kNm) | 108 | 115 |
| Tensile (MPa) | 22.8 | 22.9 |
| Elongation (%) | 210 | 308 |
| Flex Mod (MPa) | 241 | 200 |
| 5 mph Dart Impact (J) | | |
| 23° C. | 39.2 | 45.0 |
| −18° C. | 25.8 | 29.8 |
| −30° C. | 23.1 | 25.8 |

TABLE 2

|  | Example 3 | Example 4 |
| --- | --- | --- |
| Reinforcing Filler (as % of polymer) | 18% Wollastokup | 18% Wollastokup |
| Density (g/cc) | 1.13 | 1.13 |
| Tear (kNm) | 123 | 102 |
| Tensile (MPa) | 16.3 | 14.9 |
| Elongation (%) | 138 | 107 |
| Flex Mod (MPa) | 572 | 410 |
| Impact (J) | | |
| 23° C. | 22.2 | 22.9 |
| −18° C. | 8.4 | 12.5 |
| −30° C. | 4.3 | 5.3 |

TABLE 3

|  | Example 5 | Example 6 |
| --- | --- | --- |
| Reinforcing Filler (as % of polymer) | 18% Wollastokup 1% Dualite | 18% Wollastokup 1% Dualite |
| Density (g/cc) | 1.04 | 1.04 |
| Tear (kNm) | 108 | 90 |
| Tensile (MPa) | 13.4 | 12.2 |
| Elongation (%) | 100 | 109 |
| Flex Mod (MPa) | 393 | 428 |

TABLE 3-continued

|  | Example 5 | Example 6 |
| --- | --- | --- |
| Impact (J) | | |
| 23° C. | 12.1 | 17.1 |
| −18° C. | 4.2 | 11.7 |
| −30° C. | 2.7 | 5.0 |

TABLE 4

|  | Example 7 | Example 8 |
| --- | --- | --- |
| Reinforcing Filler (as % of polymer) | 8% Wollastokup G 4.4% Z-Light W-1000 | 8% Wollastokup G 7% Z-Light W-1000 |
| Density (g/cc) | 0.95 | 0.94 |
| Tear (kNm) | 56 | 51 |
| Tensile (MPa) | 12.3 | 11.8 |
| Elongation (%) | 167 | 153 |
| Flex Mod (MPa) | 259 | 285 |
| Impact (J) | | |
| 23° C. | 20.3 | 18.8 |
| −18° C. | 15.5 | 13.2 |
| −30° C. | 8.8 | 7.1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid, room temperature stable, polyisocyanate having an isocyanate group content of from 10 to 30% by weight and being prepared by reacting:
   a) an isocyanate mixture comprising:
      1) from 45 to 96% by weight of 4,4'-diphenylmethane diisocyanate,
      2) from 1 to 10% by weight of 2,4'-diphenylmethane diisocyanate, and
      3) an amount of an isocyanate based upon diphenylmethane diisocyanate having an isocyanate functionality of more than 2, such that the total isocyanate mixture a) has an average isocyanate functionality of from 2.02 to 2.50, and
   b) a polyol mixture comprising
      1) one or more diols having molecular weights of from 1000 to 5000, and
      2) one or more triols having molecular weights of from 1000 to 6000,
      wherein the weight ratio of diol to triol is from 6:4 to 4:6.

2. The polyisocyanate of claim 1 having an isocyanate group content of from 15 to 25% by weight, and wherein
   a) said isocyanate mixture comprises:
      1) from 80 to 95% by weight of 4,4'-diphenylmethane diisocyanate,
      2) from 2 to 7% by weight of 2,4'-diphenylmethane diisocyanate.

3. The polyisocyanate of claim 2 having an isocyanate group content of from 18 to 23% by weight, and wherein
   a) said isocyanate mixture comprises:
      1) from 90 to 94% by weight of 4,4'-diphenylmethane diisocyanate,
      2) from 4 to 6% by weight of 2,4'-diphenylmethane diisocyanate, and
      3) an amount of an isocyanate based upon diphenylmethane diisocyanate having an isocyanate functionality of more than 2, such that the total isocyanate mixture a) has an average isocyanate functionality of from 2.05 to 2.20.

4. The polyisocyanate of claim 1, wherein component b) comprises a mixture of polyether diols and polyether triols.

5. The polyisocyanate of claim 1, wherein component a)3) is selected from the group consisting of polymethylene poly(phenyl isocyanates), carbodiimide group-containing polyisocyanates, allophanate group-containing polyisocyanates, isocyanurate group-containing poly-isocyanates, biuret group-containing polyisocyanates, and mixtures thereof.

6. The polyisocyanate of claim 5, wherein component a)3) is a polymethylene poly(phenylisocyanate).

7. The polyisocyanate of claim 1 wherein said diol has a molecular weight of from 2000 to 4000 and said triol has a molecular weight of from 1500 to 5500.

8. The polyisocyanate of claim 1, wherein the weight ratio of diol to triol is 1:1.

9. A process for the production of a molding by reacting a reaction mixture comprising: a) a liquid, room temperature stable polyisocyanate as claimed in claim 1, b) one or more relatively high molecular weight active hydrogen group containing compounds, and c) one or more relatively low molecular weight chain extenders, said reaction mixture being processed inside a mold as a one-shot system by the RIM process at an isocyanate index of from about 70 to about 130, allowing said reaction mixture to fully react, and removing the resultant molding from the mold.

10. The molded article produced by the process of claim 9.

* * * * *

UNITED STATES PATENT AND TRADEMARK OFFICE
CERTIFICATE OF CORRECTION

PATENT NO. : 5,585,452
DATED : December 17, 1996
INVENTOR(S) : Michael F. Hurley et al It is certified that error appears in the above-indentified patent and that said Letters Patent is hereby corrected as shown below:

On the title page, item [54], title page and column 1, line 3, correct "DLLSOCYANATES" to -- DIISOCYANATES--.

Column 1, line 3, correct "DLLSOCYANATES" to --DIISOCYANATES--.

Column 1, line 67, correct "4,261,8520" to --4,261,852--.

Column 4, line 38, correct "poly-isocyanates. biuret" to --polyisocyanates, biuret--.

Column 5, line 19, correct "BF3" to --$BF_3$--.

Column 5, line 42, correct "directly carded" to --directly carried--.

Column 7, lines 16-17, correct "1-methyl-3.5-diethyl-2.4-diaminobenzene" to --1-methyl-3,5-diethyl-2,4-diaminobenzene--.

Column 7, line 17, correct "1-methyl-3.5-diethyl-2,6-diamino-benzene" to --1-methyl-3,5-diethyl-2,6-diamino-benzene--.

Column 7, line 32, correct "1.4-phenylenediamine" to --1,4-phenylene-diamine--.

Column 7, lines 33-34, correct "triphenylmethane4,4',4"-triamine" to --triphenylmethane-4,4',4"-triamine--.

Column 7, lines 36-37, correct "4.4'-di-(methylamino)diphenyl-methane" to --4,4'-di-(methylamino)diphenyl-methane--.

UNITED STATES PATENT AND TRADEMARK OFFICE
CERTIFICATE OF CORRECTION

PATENT NO. : 5,585,452
DATED : December 17, 1996
INVENTOR(S) : Michael F. Hurley et al It is certified that error appears in the above-indentified patent and that said Letters Patent is hereby corrected as shown below:

Column 10, line 6, correct "tin(11)" to --tin(II)--.

Column 10, line 6-7, correct "carboxylic adds" to --carboxylic acids--.

Column 10, line 7, correct "diaikyltin" to --dialkyltin--.

Column 10, lines 9-10, correct "1,4-diazabicyclo[2,2,21]octane" to --1,4-diazabicyclo[2,2,2]octane--.

Column 10, line 23, correct "fatty adds" to --fatty acids--.

Column 10, line 23, correct "sulfonic add" to --sulfonic acid--.

Column 10, line 24, correct "dodecylbenzene-sulfonic add" to --dodecylbenzene-sulfonic acid--.

Column 10, line 25, correct "sulfonic add" to --sulfonic acid--.

Column 10, line 25, correct "fatty adds" to --fatty acids--.

Column 10, line 41, correct "add esters" to --acid esters--.

Column 10, line 45, correct "containing adds" to --containing acids--.

Column 11, line 55, correct "Dad Impact" to --Dart Impact--.

UNITED STATES PATENT AND TRADEMARK OFFICE
CERTIFICATE OF CORRECTION

PATENT NO. : 5,585,452
DATED : December 17, 1997
INVENTOR(S) : Michael F. Hurley et al It is certified that error appears in the above-indentified patent and that said Letters Patent is hereby corrected as shown below:

Column 12, line 15, correct "reacion" to --reaction--.

Column 13, line 7, correct "min." to --mm--.

Column 14, line 38, correct "4,5 mm" to --4.5 mm--.

Column 14, line 49, correct "358" to --356--.

Signed and Sealed this

Fifteenth Day of April, 1997

Attest:

BRUCE LEHMAN

Attesting Officer

Commissioner of Patents and Trademarks